(12) United States Patent
Algiene (10) Patent No.: US 8,315,952 B2
(45) Date of Patent: Nov. 20, 2012

(54) MONEY TRANSFERS USING DIGITAL CASH

(75) Inventor: Ken Algiene, Highlands Ranch, CO (US)

(73) Assignee: First Data Corporation, Greenwood Village, CO (US)

( * ) Notice: Subject to any disclaimer, the term of this patent is extended or adjusted under 35 U.S.C. 154(b) by 374 days.

(21) Appl. No.: 11/684,997

(22) Filed: Mar. 12, 2007

(65) Prior Publication Data

US 2007/0215689 A1   Sep. 20, 2007

Related U.S. Application Data (60) Provisional application No. 60/782,727, filed on Mar. 14, 2006.

(51) Int. Cl.
*G06Q 20/00* (2012.01)
(52) U.S. Cl. ............... 705/67; 705/64; 705/75; 705/76
(58) Field of Classification Search .............. 705/67, 705/65, 66, 53, 76, 78, 64, 75; 235/379
See application file for complete search history.

(56) References Cited

U.S. PATENT DOCUMENTS

| | | | |
|---|---|---|---|
| 5,878,138 A * | 3/1999 | Yacobi .............................. | 705/69 |
| 5,905,976 A * | 5/1999 | Mjolsnes et al. ................. | 705/39 |
| 6,157,920 A | 12/2000 | Jakobsson et al. | |
| 6,446,052 B1 | 9/2002 | Juels | |
| 6,474,545 B1 | 11/2002 | Haeno et al. | |
| 7,039,617 B1 * | 5/2006 | Droege et al. .................... | 705/67 |
| 2002/0016763 A1 * | 2/2002 | March .............................. | 705/39 |
| 2002/0120530 A1 * | 8/2002 | Sutton et al. ..................... | 705/26 |
| 2003/0126083 A1 * | 7/2003 | Seifert et al. ..................... | 705/43 |

OTHER PUBLICATIONS

White, Ron, "How Computers Work", Millennium Ed., Que Corporation, Indianapolis, IN, 1999.*
Laurie Law, Susan Sabett, Jerry Solinas; How to Make a Mint: The Cryptography of Anonymous Electronic Cash; Jun. 18, 1996; 30 pages; National Security Agency Office of Information Security Research and Technology; downloaded at http://jya.com/nsamint.htm on Mar. 6, 2006.
Jon W. Matonis; Digital Cash & Monetary Freedom; Apr. 1995; 11 pages; downloaded from http://www.isoc.org/HMP/PAPER/136/html/paper.html on Mar. 6, 2006.
PCT Search Report mailed Aug. 5, 2008, Reference No. PCT/US07/63998, 7 pages.

* cited by examiner

*Primary Examiner* — Chrystina Zelaskiewicz
(74) *Attorney, Agent, or Firm* — Kilpatrick Townsend & Stockton LLP (57) ABSTRACT

Methods and systems are described for transferring funds from a sender to a recipient. Source funds are received from a sender. An amount of recipient funds is determined from a value of the source funds. A transfer identifier associated with the recipient funds is generated and provided to the sender. The transfer identifier is received from the recipient, prompting a transfer in control of the recipient funds to the recipient. At least one of the source funds and the recipient funds are in the form of one or more electronic tokens. Each such electronic token has a currency amount and a digital signature identifying a financial institution that backs the electronic token for the currency amount.

28 Claims, 6 Drawing Sheets

MONEY TRANSFERS USING DIGITAL CASH

CROSS REFERENCE TO RELATED APPLICATION

This application is a nonprovisional of, and claims the benefit of U.S. Provisional Patent Appl. No. 60/782,727, entitled "MONEY TRANSFERS USING DIGITAL CASH," filed Mar. 14, 2006, the entire disclosure of which is incorporated herein by reference for all purposes.

BACKGROUND OF THE INVENTION

This application relates generally to financial transfers. More specifically, this application relates to methods and systems for implementing money transfers using digital cash.

Currently, there are a variety of different ways in which funds may be transferred from one person to another. Perhaps the simplest of such different types of transfers is a simple cash transfer in which one person hands cash to another person. While such a simple technique is clearly adequate when the parties are together and have sufficient cash on hand, it is generally impractical when the parties are separated and/or the amounts to be transferred are larger. Transmission of cash by mail is subject to a variety of risks of loss or theft. This risk may be mitigated through the use of negotiable instruments that identify a payee. With such techniques, funds are transferred by preparing an instrument, usually drawn on a bank or other financial institution, and transmitting it to the payee by mail or using some similar transmission service.

While the use of negotiable instruments is satisfactory for a number of different circumstances, they are impractical in many others. For instance, the transmission time of physical checks may sometimes be undesirably long, particularly in emergency situations where funds need to be transferred quickly. In some cases, transfers to other countries may cause difficulties with currency exchanges if neither the sender nor recipient is equipped to accommodate the currency differences. The use of checks is also often not an option for a certain population segment that rarely or never uses banking services. In these and a variety of other circumstances, other techniques for transferring funds are desirable.

BRIEF SUMMARY OF THE INVENTION

Embodiments of the invention thus provide methods and systems of transferring funds from a sender to a recipient. Source funds are received from a sender. An amount of recipient funds is determined from a value of the source funds. A transfer identifier associated with the recipient funds is generated and provided to the sender. The transfer identifier is received from the recipient, prompting a transfer in control of the recipient funds to the recipient. At least one of the source funds and the recipient funds are in the form of one or more electronic tokens. Each such electronic token has a currency amount and a digital signature identifying a financial institution that backs the electronic token for the currency amount.

In some such embodiments, the source funds are in the form of one or more electronic tokens. The one or more electronic tokens may then be transmitted to the financial institution with a request to increase a balance of an identified account by an amount corresponding to a sum of the currency amounts of the one or more electronic tokens. In addition, a challenge may be transmitted to the sender and a response to the challenge received from the sender. The response comprises a first portion of a set of information. A combination of the first portion of the set of information with a second portion of the set of information different from the first portion identifies the sender. Selection of the first portion from the set of information is determined by characteristic of the challenge. In some cases, the transfer identifier may be received from the recipient in person at a local office. The recipient funds may then be transferred to the control of the recipient by providing cash or a financial instrument for the amount of the recipient funds to the recipient in person at the local office. The transfer identifier may be received from the recipient electronically over a public network.

In other embodiments, the recipient funds are in the form of one or more electronic tokens. In such cases, a challenge may be received from the recipient and a response to the challenge transmitted to the recipient. The response comprises a first portion of a set of information. A combination of the first portion of the set of information with a second portion of the set of information different from the first portion identifies a money-transfer provider transferring control of the recipient funds. Selection of the first portion from the set of information is determined by characteristics of the challenge. The source funds may sometimes be received in cash or as a financial instrument for an amount of the source funds from the sender in person at a local office. The recipient funds may be generated as one or more electronic tokens. A coin number is generated for each of the one or more electronic tokens and a digital signature appended to the generated coin number. The digital signature results from application of a one-way hash function to the coin number.

The amount of the recipient funds may be determined by reducing an amount of the source funds by an applicable service charge. The one or more electronic tokens may comprise blinded electronic tokens. For instance, in one embodiment, the source funds are in the form of one or more blinded electronic tokens and the sender is anonymous.

In certain embodiments, the sender comprises a plurality of senders. The source funds are received as a plurality of source-fund contributions from the plurality of senders. The amount of the recipient funds is determined from a cumulative value of the plurality of source-fund contributions. In some cases, at least one of the source-fund contributions is in the form of one or more electronic tokens. In other cases, at least two of the source-fund contributions are in different currencies.

The methods of the invention may be implemented with a money-transfer system that comprises a storage device, a communications system, and a processor in communication with the storage device and the communications system. A memory is coupled with the processor. The memory comprises a computer-readable storage medium having a computer-readable program embodied therein with instructions to operate the money-transfer system as described above to transfer funds from a sender to a recipient.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

1. Digital Cash

Embodiments of the invention provide methods and systems for performing financial transfers that make use of digital cash, either on the part of the sender or the recipient. While it is possible for both the sender and recipient to use digital cash in a transfer using the financial-transfer system, it is generally expected that the financial-transfer system will be involved in only certain types of transactions. For instance, a description is provided below of pooled transactions in which a sender and a recipient may both be capable of using digital cash, but benefit from aspects of the arrangement for the transfer enabled by the financial-transfer system. In other instances where there is a single sender and a single recipient who do not require any currency exchange, it may be simpler for the transfer to be made between the parties without the participation of the financial-transfer system.

As used herein, "digital cash" refers to currency that is maintained as electronic tokens. Each token comprises a set of data maintained as a discrete file or other electronic entity. The set of data include an identification of a financial institution that backs the electronic token as currency, usually including a cryptographic signature embedded by the financial institution or in accordance with protocols established by the financial institution. The set of data also include a value identifier from which the value of the token as currency may be determined. In most instances, the set of data also include an identifier unique to the token, which may be used in managing certain otherwise potential fraud schemes involving duplication of the token so that it may be spent multiple times. Such a unique identifier may be considered to be a counterpart to a serial number used with conventional paper cash.

Digital cash may also be characterized in terms of functional attributes that are reminiscent of paper cash and that have counterparts in a paper-cash system. In different embodiments described below, some or all of the following functional attributes may be afforded to the electronic tokens. First, both paper and digital cash may be portable. In the case of digital cash, such portability is a consequence of the physical nature of the paper, which may be carried in a wallet or other suitable receptacle. Similar portability is enjoyed by digital cash, which may be stored in a variety of types of electronic memory that include both fixed and portable memory such as may be contained in cellular telephones, PDA's, laptops, etc. Related to portability is transferability. Paper cash may readily be transferred to another party simply by giving the physical notes to the other party. Digital cash may also be transferred to another party, in this instance through an electronic transfer, provided it maintains a status of "unspent."

In addition, paper cash is generally untraceable, at least in normal usage, in that no record is maintained of where particular notes are spent. Such untraceability may also be provided in arrangements that use digital cash as described below. The counterpart to untraceability is anonymity, with there generally being no record of who spent a particular paper note in paper-cash systems. Such anonymity may also be provided in digital-cash arrangements using the techniques described below.

The various security features afforded to digital cash are achieved through the use of cryptographic digital signatures that are incorporated into the electronic tokens. Such cryptographic signatures may be based on public/private key pairs in which a private key is used to create a digital signature and a public key is used to verify the digital signature. One commercially available public/private key encryption scheme is RSA encryption, with the acronym being derived from the initials of the surnames of the inventors. Briefly, this encryption scheme is based on the difficulty of extracting roots of numbers with unknown factorization. An entity that creates the digital signature knows the factorization and is therefore able to calculate the result of a one-way collision-free hash function, but other entities cannot. A one-way has function is a function that is easily applied to a certain domain but which is difficult to invert mathematically. That is, for a function $f$, calculation of the function's output $t = f(s)$ is easy over a domain that includes input s, but calculation of the inverse of the function $s = f^{-1}(t)$ is difficult. When the function is collision-free, it is further difficult to find two inputs $s_1$ and $s_2$ that map to the same output value t.

This basic technique may be modified to provide untraceability by application of a "blinding factor" to produce a "blind signature" that signs the digital-cash tokens. Such blinding is illustrated for a specific embodiment with the flow diagram of FIG. 1. In this illustration, a financial institution that will back digital cash publishes two pieces of information at block 104: a public modulus M and an exponent n. The financial institution knows the factorization of M=pq since it can simply calculate M by multiplying the prime factors. When M is a large number, however, it is difficult to determine the factors p and q. A user who wishes to generate digital cash selects a random coin number c and a blinding factor b at block 108. Both b and c are selected from the domain $Z_M$, i.e. are integers drawn from the inclusive interval between 0 and M−1. The coin is defined by the coin number c, which may be considered to be the unique identifier corresponding to a conventional serial number. As indicated at block 112, the user calculates a blinded coin number by application of the hash function $f$, multiplied by the nth power of the blinding factor: $b^n f(c) \mod M$.

Figure 1:
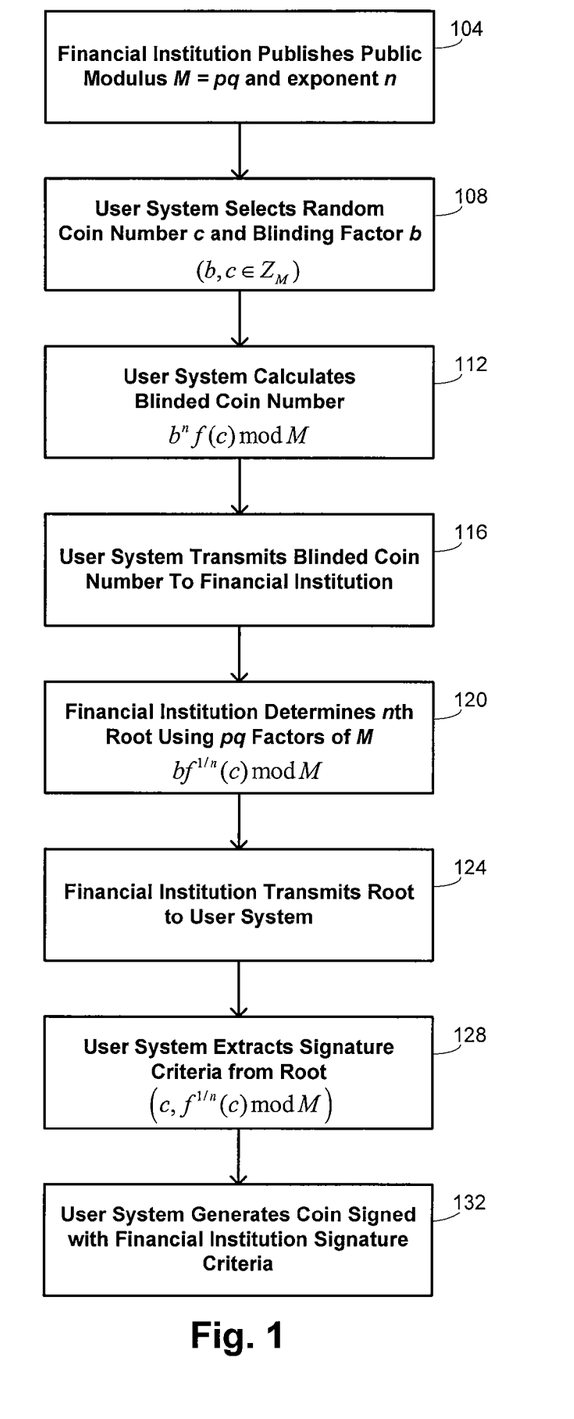
FIG. 1 is a flow diagram summarizing methods for generating anonymous digital cash.

This blinded coin number is transmitted by a user system to the financial institution at block 116. Because the financial institution knows the factorization of M, it can readily compute the nth root of the blinded coin number, $bf^{1/n}(c) \mod M$ at block 120, a calculation that cannot readily be performed by the user (or anyone else) without knowledge of the factorization. The result of the factorization is thus transmitted back to the user system at block 124. Because the user system knows the blinding factor b, it can readily calculate $f^{1/n}(c) \mod M$ by dividing the result received from the financial institution by b. This is not a calculation that can readily be performed by the financial institution (or anyone else) without knowledge of the blinding factor.

The result of these operations is that the user is now able to extract the coin number c that defines the coin and a signature value $f^{1/n}(c)\bmod M$ at block 128, and thereby generate a digital coin signed with the financial-institution criteria at block 132. This signature value acts as an imprimatur by the financial institution, whose involvement was necessary to calculate the value. But in calculating the value, the financial institution was never informed of the actual value of c and has no way of associating c with the user. Verification of the validity of the coin requires only an ability to calculate f(c), an easy operation, and to compare that result with the nth power of $f^{1/n}(c)\bmod M$.

One drawback to providing anonymity with digital cash is that the potential for fraud is enhanced by the ability to duplicate an electronic token. While it is readily possible to record when a particular token has been spent, and therefore to refuse to honor a duplicate of a spent token, the anonymous aspect of the digital cash makes it difficult to identify the person who improperly copied the duplicated token. Mechanisms may accordingly be provided that prevents a token from being traced to an original user if it is used only once, but which provides a high probability of being traceable to that user if used more than once. One such mechanism uses a challenge-response protocol. In such a protocol, a recipient of an electronic token transmits a challenge quantity to the sender, who returns a piece of identifying information determined by the challenge quantity. Because of the randomness in the challenge-response protocol, receipt of only one piece of information is insufficient to identify the sender, but receipt of two or more pieces of information is likely to permit identification.

For instance, the sender may construct and blind a message having k pairs of numbers, each pair being sufficient to identify the sender. A challenge transmitted in response to transmitting an electronic token may be a random string defining which of each pair is to be returned. If the token is spent only once, the recipient (and ultimately the financial institution) receive only half of any particular number pair, which is insufficient to identify the sender. But if the sender transmits the token a second time, the challenge will generally be a string that differs in requesting the different half of at least one of the pairs, permitting the sender to be identified when combined with the first response.

2. Money Transfers

Embodiments of the invention integrate the use of digital cash into a money-transfer system. The money-transfer system accommodates senders and recipients located in different countries that may use different currencies, permits funds to be transferred or received by parties who have no access to computational devices or electronic networks, and provides other advantages that will be evident after reading the following description.

Figure 2:
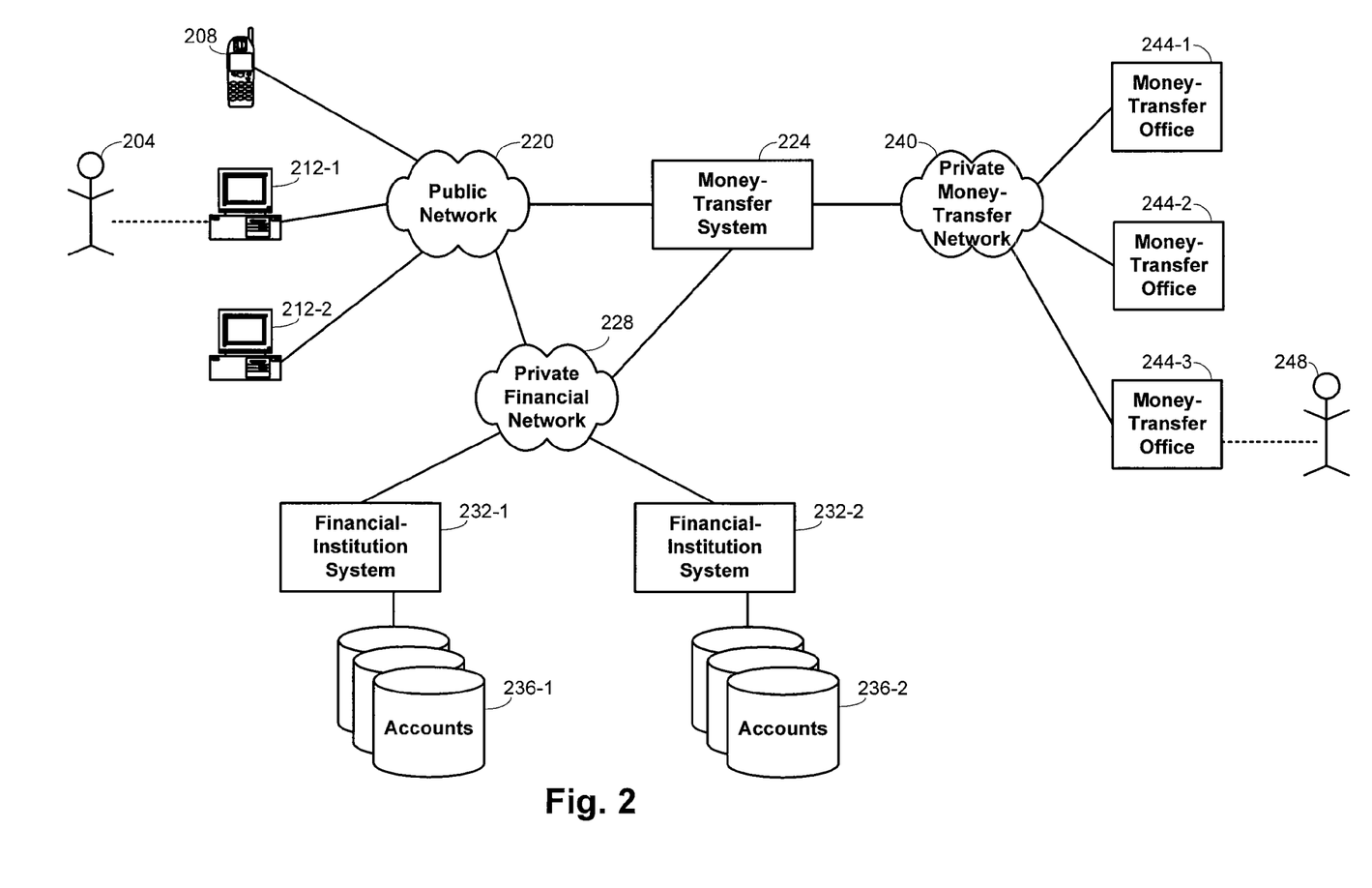
FIG. 2 is a schematic illustration of an architecture in which money transfers may be effected using digital cash.

An overview of an architecture within which money transfers may be effected in accordance with embodiments of the invention is illustrated in FIG. 2. Transfers of funds are coordinated with a money-transfer system 224, which comprises a computational device having programming to implement the methods described herein. The money-transfer system 224 has connections with a variety of different parties that may be involved with the transfer through a public network 220, a private money-transfer network 240, and a private financial network 228. The public network 220 may comprise the Internet in one embodiment and permits the money-transfer system to communication with a variety of different user computational devices, with the drawing explicitly showing examples of personal computers 212 and cellular telephones 208. Other examples of computational devices that may be used in other embodiments include, without limitation, PDAs, laptops, digital cameras and camcorders, and the like. Connections between the computational devices 208 and 212 may be wired or wireless, using any suitable communications protocol for network interfacing. A user 204, who may take the role of sender or receiver in different embodiments, interacts with the architecture through one of the computational devices 208 or 212.

The private financial network 228 permits connections to be made with financial-institution systems 232 that may maintain accounts 236 holding monetary amounts on behalf of other parties. Examples of financial institutions that may be connected with the private financial network 228 include banks, credit unions, brokerage houses, and the like. In many instances, the private financial network 228 is also coupled with the public network 220 to permit users 204 to access account information and services directly from the financial institutions.

The private money-transfer network 240 provides connections between a plurality of geographically distributed money-transfer offices 244 and the money-transfer system 224. Each of the money-transfer offices 244 may provide local services in geographical areas near each of the offices. The presence of such offices permits senders or recipients 248 in a money transfer to provide funds directly to a money-transfer provider. In some instances, the money-transfer offices 244 may be dedicated offices that provide only money-transfer services, but more frequently such offices provide money-transfer services as a result of their interface with the private money-transfer network 240 as a service incidental to a primary service. Examples of primary services include retail services such as may be provided by convenience stores, fuel services as may be provided by gasoline stations, and the like. The money-transfer offices 244 may thus be staffed by clerks who operate equipment that exchanges information relevant to a money transfer with the money-transfer system 224. Alternatively or additionally, the money-transfer offices 244 may comprise self-serve stations such as kiosks with which a sender or recipient 248 may interact directly in an automated fashion.

The private nature of the financial and money-transfer networks 228 and 240 may be implemented using a variety of access controls. For example, simple access controls may require that users of those networks provide passwords, while more complex access controls may require the exchange of digital signatures or even a check of biometric information.

Figure 3:
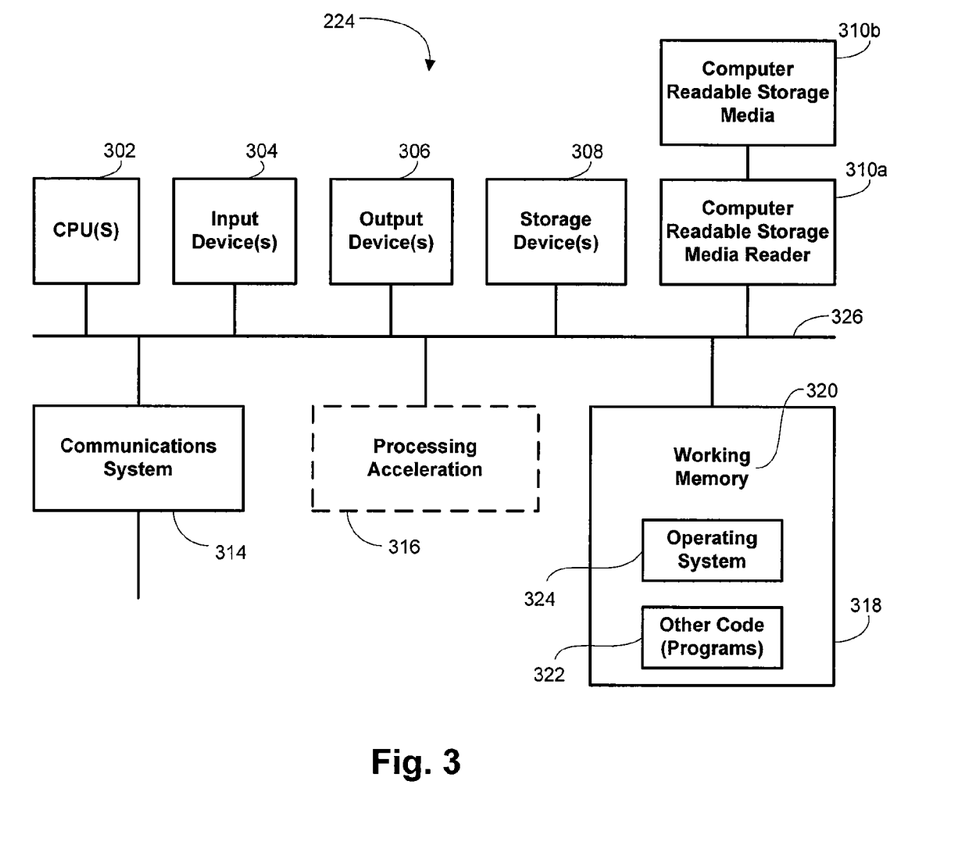
FIG. 3 is a schematic illustration of a money-transfer computer system on which methods of the invention may be embodied.

FIG. 3 provides a schematic illustration of a structure that may be used to implement the money-transfer system 224. FIG. 3 broadly illustrates how individual system elements may be implemented in a separated or more integrated manner. The money-transfer system 224 is shown comprised of hardware elements that are electrically coupled via bus 326, including a processor 302, an input device 304, an output device 306, a storage device 308, a computer-readable storage media reader 310a, a communications system 314, a processing acceleration unit 316 such as a DSP or special-purpose processor, and a memory 318. The computer-readable storage media reader 310a is further connected to a computer-readable storage medium 310b, the combination comprehensively representing remote, local, fixed, and/or removable storage devices plus storage media for temporarily and/or more permanently containing computer-readable information. The communications system 314 may comprise a wired, wireless, modem, and/or other type of interfacing connection and permits data to be exchanged with the public network 220, private money-transfer network 240, and/or private financial network 228 as described above.

The money-transfer system 224 also comprises software elements, shown as being currently located within working memory 320, including an operating system 324 and other code 322, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Figure 4:
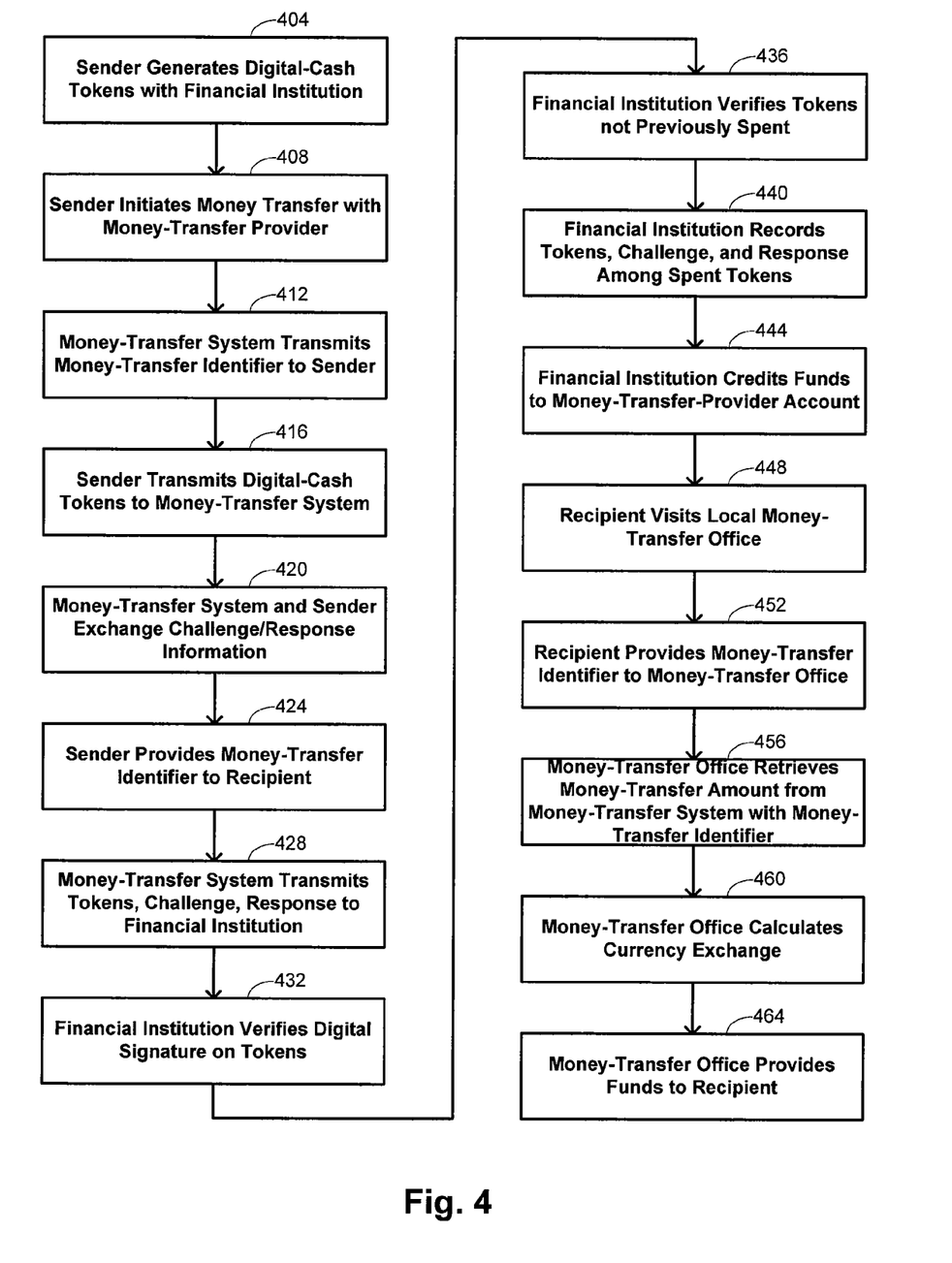
FIG. 4 is a flow diagram summarizing certain methods for transferring funds where the sender is equipped to provide digital cash.
Figure 5:
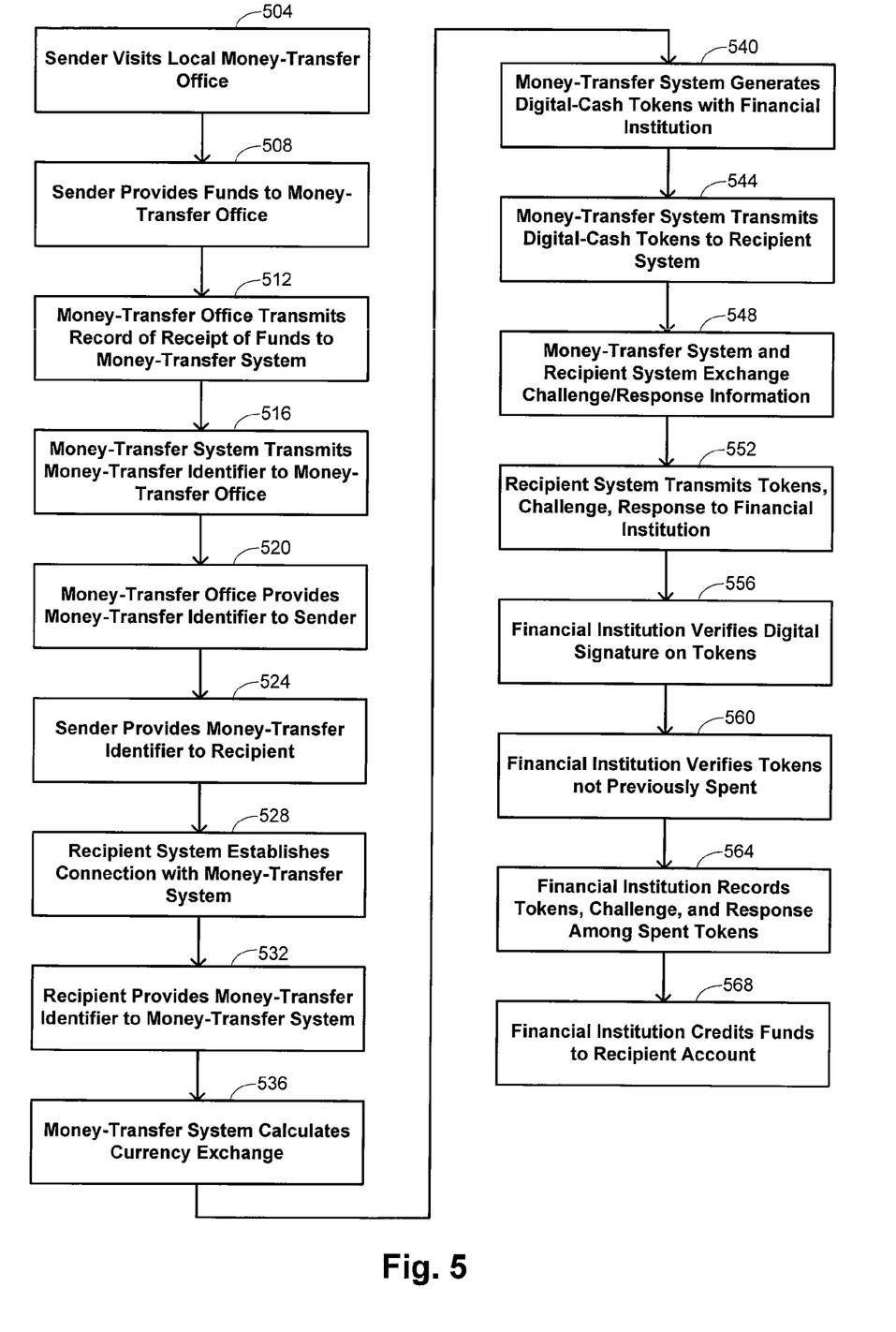
FIG. 5 is a flow diagram summarizing certain methods for transferring funds where the recipient is equipped to receive digital cash.
Figure 6:
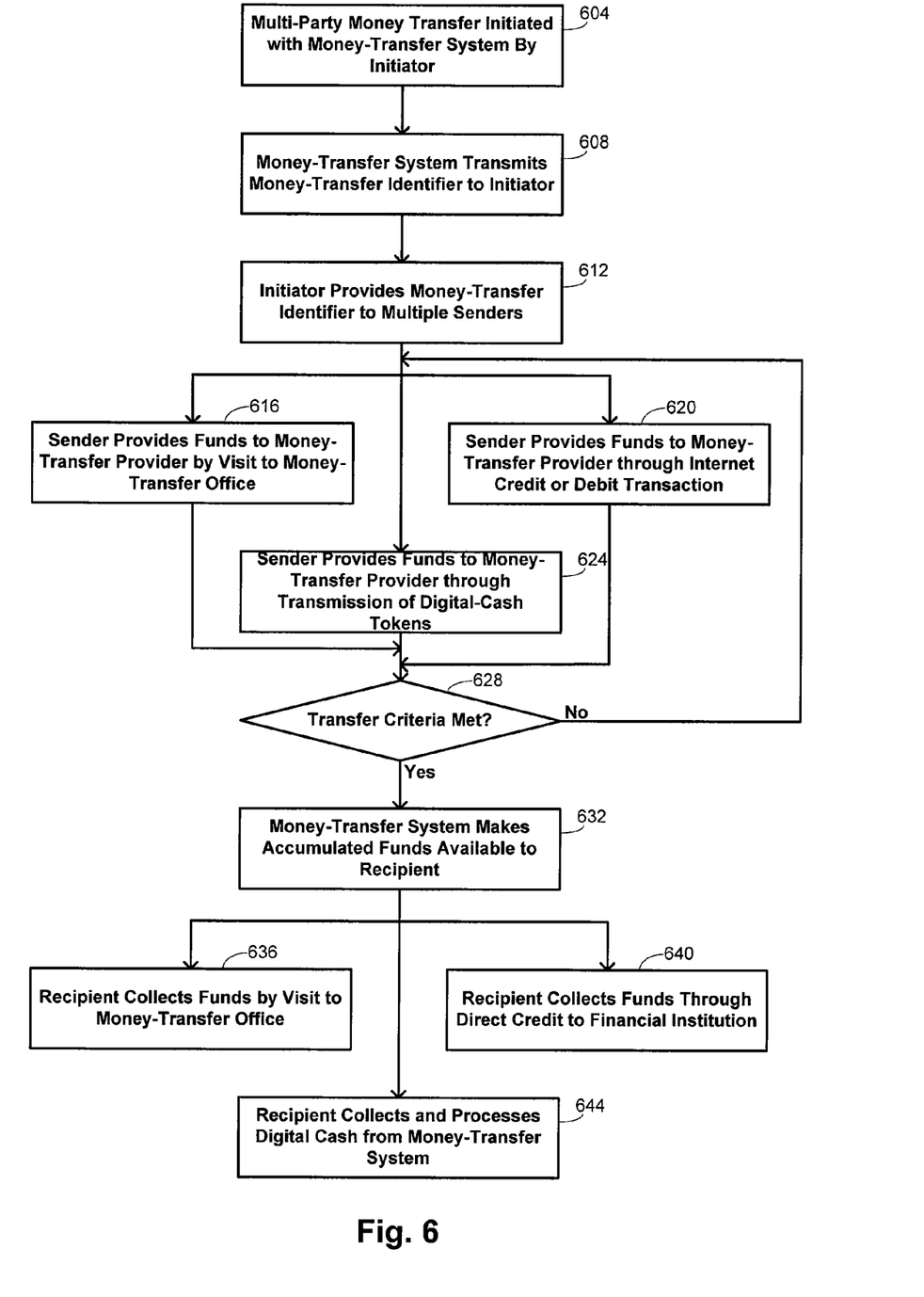
FIG. 6 is a flow diagram summarizing methods for using a funds-transfer arrangement to implement pooled transactions using digital cash.

Different types of money transfers enabled by the architecture shown in FIG. 2 are illustrated with the flow diagrams of FIGS. 4-6. The flow diagram of FIG. 4 illustrates an embodiment in which a sender in a money-transfer operation using the architecture transmits digital cash. Such a process begins as indicated at block 404 with the sender generating digital-cash tokens with a financial institution 232. This may be done in a particular embodiment using the method described in connection with FIG. 1, although the invention is not limited to specific digital-cash generation methods.

The money transfer is initiated at block 408 by the sender. In cases where the sender will be transmitting digital cash, it is generally expected that the sender has access to a computational device interfaced with the public network 220. Initiation of the money transfer at block 408 may thus proceed by the sender using the public network 220 to access an Internet interface in the form of a web page generated by the money-transfer system 224. The web page may include fields for the sender to provide information used in initiating the transfer. In some instances, this information might omit an identity of the sender, permitting the transfer to be made anonymously. Once the process is initiated, the money-transfer system 224 responds by generating a money-transfer identifier and transmitting the identifier to the sender at block 412. This identifier may be used by any parties to the money transfer to identify it specifically.

At block 416, the sender transmits the funds to be transferred in the form of digital-cash tokens. Acceptance of the tokens may require that the sender respond to a challenge issued by the money-transfer system 224 at block 420, with the challenge/response information serving as a basis for identifying the person who generated the digital cash in case it is duplicated.

With the funds having been provided to the money-transfer provider in this way, the sender provides the money-transfer identifier to the recipient at block 424. This identifier will permit the recipient to collect the funds in a variety of different ways by providing the identifier to the money-transfer system 224. The identifier may be provided to the recipient using any effective mechanism, including by telephone, by post, by electronic mail, by fax, etc. At the same time, the money-transfer system 224 seeks to validate the digital cash that was received by transmitting the tokens to a financial institution 232 at block 428. Such a transfer is performed over the private financial network 228 and may include the challenge and response if receipt of the tokens was accompanied by issuance of a challenge. The financial institution 232 verifies the digital signature on the tokens at block 432, thereby confirming their financial value. Such verification may be performed as described above in connection with FIG. 1. In addition, the financial institution 232 verifies at block 436 that the tokens are still active by not having previously been spent. Such checks act to confirm the legitimacy of the tokens as cash, prompting the financial institution to record the tokens, and perhaps also the challenge and response, among a list of spent tokens at block 440. Funds having the corresponding value are credited to an account maintained on behalf of the money-transfer provider at block 444. In many instances, this account is maintained by the same financial institution 232 that originally validated the digital cash. But in some cases, the account may be maintained at a different financial institution, in which case crediting of the account at block 444 may comprise transmitting information regarding the credit to the different financial institution over the private financial network.

To receive the transferred funds, the recipient has a number of options. The option illustrated in the drawing is an in-person collection in which the recipient visits a local money-transfer office 244 at block 448. As indicated at block 452, the recipient provides the money-transfer identifier at the office 244, either by providing the identifier to a clerk who keys it into a local device or by keying the identifier directly at a self-service kiosk. The money-transfer office transmits the identifier over the private money-transfer network 240 to the money-transfer system 224, which responds by confirming the validity of the identifier and providing the amount of money transferred at block 456. In some instances, this amount is less than the value of the digital cash provided by the sender to reflect collection of a service charge. If the recipient is located in a country that uses a different currency than the transfer amount, the money-transfer office 244 may calculate the currency exchange at block 460 and provide the funds to the recipient at block 464. The funds may be provided in cash, with a negotiable instrument such as a check or money order, or on a stored-value card. In other instances, the funds may be credited to an account maintained by the recipient at a financial institution 228 by providing deposit information over the private financial account 228. Also, while this illustration is one in which the currency exchange is performed at the local money-transfer office 460, it is possible in some embodiments for the currency exchange to have been performed at the money-transfer system 224. When the currency exchange is performed at the money-transfer system 224, it may be performed using the exchange rate at the time funds were received from the sender, using the exchange rate at the time the request was made by the recipient, or using the exchange rate from some intermediate time. Different offerings regarding the exchange rate may be provided as options to the sender at the time the transfer is initiated.

As previously noted, it is not a requirement that the recipient be personally present at a money-transfer office to collect the transferred funds. In other instances, the recipient may interface with the money-transfer system 224 directly using a computational device connected with the public network 220. In such instances, the recipient may provide an account number at a financial institution where the funds are to be deposited using the private financial network, may request that a credit be applied to a credit account, may request that a check or money order be mailed to a specified address, or the like. In still other embodiments, instructions may be communicated by the recipient to the money-transfer provider using other mechanisms, such as a telephone or the like.

FIG. 5 illustrates an embodiment in which the recipient wishes to receive the transferred funds as digital cash. In this illustration, the sender lacks access to any kind of computational device and accordingly visits a local money-transfer office 244 at block 504, providing funds to the office at block 508. The funds may be provided in cash, by negotiable instrument such as check or money order, by a credit-card payment, or any other payment mechanism. After confirming receipt of the funds, the money-transfer office 244 transmits a record of their receipt to the money-transfer system 224 at block 512. In other embodiments, the sender may provide funds to the money-transfer provider through a computational interface over the public network 220, by telephone, or any other suitable mechanism.

As indicated at block 516, the money-transfer system 224 responds to receipt of the record of receipt of funds by transmitting a money-transfer identifier to the money-transfer office 244. This identifier functions in the same fashion as described in connection with FIG. 4 to identify the money-transfer transaction. In turn, the money-transfer office 244 provides the money-transfer identifier to the sender at block 520, permitting the sender to provide it to the recipient using any suitable mechanism at block 524.

In this embodiment, the recipient is capable of receiving digital cash to complete the money transfer and accordingly establishes a connection with the money-transfer system 224 at block 528 using the public network. Such a connection may include a web-page interface through which the recipient provides the money-transfer identifier at block 532 and indicates a desire to receive the funds as digital cash. If the recipient is located in a country that uses a different currency than the transfer amount, the money-transfer system 224 may calculate the currency exchange at block 536. The money-transfer system 224 responds at block 540 by generating digital cash tokens with a financial institution 232, such as by using the method illustrated with FIG. 1. The tokens are accordingly transmitted to the recipient's system at block 544, perhaps including a challenge and response at block 548 to provide information that may be used to ensure nonduplication of the tokens. The recipient system transmits the tokens and any challenge and response to the financial institution 232 at block 552. Similar to the description provided in connection with FIG. 4, the financial institution 232 proceeds to confirm the authenticity of the tokens by verifying their digital signatures at block 556 and verifies they have not been previously spent at block 560. With such validations, the financial institution records the tokens and any challenge and response among its records of spent tokens at block 564 and assigns a corresponding credit to an account of the recipient at block 568. The recipient account may be held at the financial institution that validates the tokens or may be held at a different financial institution in different embodiments.

While FIG. 5 does not explicitly show currency conversions, it will be appreciated that such conversions may occur as part of the process. For instance, the sender may specify that funds are to be provided to the recipient in a certain currency different from the currency of payment, and may sometimes be permitted to specify whether the conversion takes place when provided by the sender, when received by the recipient, or at some intermediate time. In other instances, the currency conversion may result from a request by the recipient to have the funds provided in digital cash based on a currency different from the original source currency. In such cases, the currency conversion may take place at the time the digital currency is provided to the recipient.

FIG. 6 provides an illustration of multiparty money transfers that may use digital cash. As the term is used herein, a "multiparty" transfer is one in which a plurality of different parties each contribute a portion of the amount to be transferred to a recipient. Such multiparty transfers are described in general detail in copending, commonly assigned U.S. patent application Ser. No. 10/391,502, entitled "METHODS AND SYSTEMS FOR COORDINATING POOLED FINANCIAL TRANSACTIONS," filed Mar. 17, 2003 by Kurt L. Hansen ("the '502 application"), the entire disclosure of which is incorporated herein by reference for all purposes. There are numerous applications that may benefit from a multiparty transaction, such as a transaction in which no single party has sufficient funds to finance a defined objective in which they have a common interest. A number of specific applications are described in the '502 application.

The multiparty transfer is initiated at block 604 by an initiator. Such initiation may take place using any of the methods described above, including through interaction with the money-transfer system 224 over the public network 220 from a computational device, by visiting a money-transfer office 244, through a telephone call to the money-transfer provider, and the like. Initiation of the transfer generally includes a specification by the initiator of criteria to be met to prompt the transfer. For instance, such criteria might specify a date at which the transfer is to be made, a total cumulative funds amount at which the transfer is to be made, etc. The specification of such criteria is desirable since multiple parties will be making contributions to the transfer amount, potentially at different times and not in a coordinated fashion. The money-transfer system 224 generates a money-transfer identifier that is provided to the initiator at block 608. This identifier may be provided by the initiator to multiple senders at block 612. The plurality of senders may include the initiator but this is not a requirement of the invention.

The drawing indicates that there are a variety of different ways that each of the senders may use to provide funds to the money-transfer provider, which ultimately aggregates the funds for transfer to a recipient. Block 616 indicates that funds may be provided by one sender visiting a money-transfer office 244, conveying the funds in cash, by negotiable instrument, with a credit instrument, or otherwise. Block 620 indicates that another sender may establish a connection with the money-transfer system 244 over the public network 220 to provide credit or debit instructions. Block 624 indicates that another sender may transmit digital cash tokens as described above, with the money-transfer system 224 performing the various steps described to validate the tokens.

A check is made at block 628 whether the specified transfer criteria have been met. If not, additional contributions may be made by senders using any of the methods indicated at blocks 616, 620, and 624. Once the criteria have been met, the money-transfer system 224 effects the transfer by making the accumulated funds available to the recipient, perhaps less a service charge at block 632. As part of this process, the distinctions in fund types that result from the different contribution mechanisms are removed, at least from the perspective of the recipient who may be offered the ability to receive the funds in any desired fashion. For instance, block 636 indicates that the recipient may collect the accumulated funds by visiting a local money-transfer office 244, which may distribute the funds in the variety of ways described above. Alternatively, block 640 indicates that the recipient could request that the funds be credited directly to an account in a financial institution, providing such a request through any available mechanism such as through a connection with the money-transfer system 224 over the public network, by telephone, or the like. In other instances, the recipient may collect and process digital cash using the techniques described above, as indicated at block 644.

The multiparty money transfers may also make use of currency conversions in some embodiments. Such currency conversions may be applied when funds received from different senders are provided in different currencies and/or when the recipient is to receive funds in a currency different from any or all of the sender currencies. In some instances, specification of the currency in which the recipient is to receive the accumulated funds may be provided as part of the initiation of the money transfer at block 604. In other instances, that currency may be specified by the recipient. Different embodiments may apply the rate of exchange that is prevailing at different times, such as at the time a particular sender provides funds, at the time the recipient receives the funds, or at some intermediate time.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of transferring funds from a sender to a recipient, the method comprising:
    receiving source funds from the sender, wherein the source funds comprise a first electronic token;
    transmitting a first challenge to the sender, in response to receipt of the source funds;
    receiving a first response to the first challenge from the sender, wherein the first response comprises a first portion of a first set of information, and wherein:
        the first portion provides, by itself, insufficient data to identify the sender;
        a second portion, different from the first portion, provides, by itself, insufficient data to identify the sender;
        the second portion is received from the sender, in response to a second challenge transmitted to the sender, once the first electronic token is received again at a later time;
        a combination of the first portion with the second portion identifies the sender; and
        selection of the first portion from the first set of information is determined by characteristics of the first challenge;
    determining an amount of recipient funds from a value of the source funds;
    generating, using a money-transfer provider's computer system, a money-transfer identifier identifying the recipient funds, wherein the money-transfer identifier is distinct from the first challenge and the response;
    providing the money-transfer identifier generated by the money-transfer provider's computer system to the sender while the money-transfer provider maintains control of the recipient funds;
    receiving the money-transfer identifier from the recipient; and
    transferring control of the recipient funds from the money-transfer provider to the recipient in response to receipt of the money-transfer identifier from the recipient.

2. The method recited in claim 1, the method further comprising transmitting the first electronic token to a financial institution with a request to increase a balance of an identified account by an amount corresponding to a sum of the currency amounts of the first electronic token.

3. The method recited in claim 1 wherein the first electronic token comprises:
    a currency amount; and
    a digital signature identifying a financial institution that backs the first electronic token for the currency amount.

4. The method recited in claim 2 wherein:
    receiving the money-transfer identifier from the recipient comprises receiving the money-transfer identifier from the recipient in person at a local office; and
    transferring control of the recipient funds to the recipient comprises providing cash or a financial instrument for the amount of the recipient funds to the recipient in person at the local office.

5. The method recited in claim 2 wherein receiving the money-transfer identifier from the recipient comprises receiving the money-transfer identifier from the recipient electronically over a public network.

6. The method recited in claim 1 wherein the recipient funds comprise a second electronic token, the method further comprising:
    receiving a third challenge from the recipient; and
    transmitting a second response to the third challenge to the recipient, wherein:
        the second response comprises a third portion of a second set of information, wherein the third portion by itself provides insufficient information to identify the money-transfer provider;
        a combination of the third portion of the second set of information with a fourth portion of the second set of information different from the third portion identifies the money-transfer provider transferring control of the recipient funds, wherein the fourth portion by itself provides insufficient information to identify the money-transfer provider; and
        selection of the third portion from the second set of information is determined by characteristics of the third challenge.

7. The method recited in claim 1 wherein:
    the recipient funds comprise a second electronic token; and
    receiving the source funds from the sender comprises receiving cash or a financial instrument for an amount of the source funds from the sender in person at a local office.

8. The method recited in claim 1 further comprising generating the recipient funds as a second electronic token, wherein generating the recipient funds comprises:
    generating a coin number for the second electronic token;
    appending a digital signature to the generated coin number for the second electronic token, the digital signature resulting from application of a one-way hash function to the coin number.

9. The method recited in claim 1 wherein determining the amount of the recipient funds comprises reducing an amount of the source funds by a service charge.

10. The method recited in claim 1 wherein the first electronic token comprises a blinded electronic token.

11. The method recited in claim 10 wherein the sender is anonymous.

12. The method recited in claim 1 wherein:
    the sender comprises a plurality of senders;
    receiving source funds from the sender comprises receiving a plurality of source-fund contributions from the plurality of senders; and
    determining the amount of the recipient funds comprises determining the amount of the recipient funds from a cumulative value of the plurality of source-fund contributions.

13. The method recited in claim 12 wherein at least one of the source-fund contributions is in the form of one or more electronic tokens.

14. The method recited in claim 12 wherein at least two of the source-fund contributions are in different currencies.

15. A money-transfer system comprising:
    a storage device;
    a communications system;

a processor in communication with the storage device and the communications system; and a memory coupled with the processor, the memory comprising a computer-readable storage medium having a computer-readable program embodied therein for operating the money-transfer system to transfer funds from a sender to a recipient, the computer-readable program including instructions to:

receive source funds from the sender;

determine an amount of recipient funds from a value of the source funds;

generate a money-transfer identifier identifying the recipient funds;

provide the money-transfer identifier to the sender;

receive the money-transfer identifier from the recipient; and transfer control of the recipient funds to the recipient in response to receipt of the money-transfer identifier from the recipient, wherein the recipient funds comprise a first electronic token;

receive a first challenge from the recipient;

transmit a first response to the first challenge from the recipient, wherein the money-transfer identifier is distinct from the first challenge and response, and wherein the first response comprises a first portion of a first set of information, and further wherein:

the first portion provides, by itself, insufficient data to identify a money-transfer provider operating the money-transfer system;

a second portion, different from the first portion, provides, by itself, insufficient data to identify the money-transfer provider operating the money-transfer system;

the second portion is transmitted to the recipient, in response to a second challenge received from the recipient, once the first electronic token is transferred from the money-transfer system again at a later time;

a combination of the first portion with the second portion identifies the money-transfer provider operating the money-transfer system; and selection of the first portion from the first set of information is determined by characteristics of the first challenge.

16. The money-transfer system recited in claim 15 wherein the source funds comprise a second electronic token, the computer-readable program further including instructions to transmit the second electronic token to a financial institution with a request to increase a balance of an identified account by an amount corresponding to a sum of the currency amounts of the second electronic token.

17. The money-transfer system recited in claim 16 wherein the computer-readable program further includes:
instructions to transmit a third challenge to the sender; and
instructions to receive a second response to the third challenge from the sender, wherein:
the second response comprises a third portion of a second set of information;
a combination of the third portion of the second set of information with a fourth portion of the second set of information different from the third portion identifies the sender; and
selection of the third portion from the second set of information is determined by characteristics of the third challenge.

18. The money-transfer system recited in claim 16 wherein:

the instructions to receive the money-transfer identifier from the recipient comprise instructions to receive an acknowledgment of receipt of the money-transfer identifier from the recipient in person at a local office over a money-transfer network interfaced with the local office and with the communications system; and the instructions to transfer control of the recipient funds to the recipient comprise instructions to provide cash or a financial instrument for the amount of the recipient funds to the recipient in person at the local office.

19. The money-transfer system recited in claim 16 wherein the instructions to receive the money-transfer identifier from the recipient comprise instructions to receive the money-transfer identifier from the recipient electronically over a public network interfaced with the communications system.

20. The money-transfer system recited in claim 15 wherein the first electronic token comprises:
a currency amount; and
a digital signature identifying a financial institution that backs the first electronic token for the currency amount.

21. The money-transfer system recited in claim 15 wherein:
the instructions to receive the source funds from the sender comprise instructions to receive an acknowledgment of receipt of cash or a financial instrument for an amount of the source funds from the sender in person at a local office over a money-transfer network interfaced with the local office and with the communications system.

22. The money-transfer system recited in claim 15 further comprising instructions to generate the recipient funds, wherein the instructions to generate the recipient funds comprise:
instructions to generate a coin number for the first electronic token; and
instructions to append a digital signature to the generated coin number for the first electronic token, the digital signature resulting from application of a one-way hash function to the coin number.

23. The money-transfer system recited in claim 15 wherein the instructions to determine the amount of the recipient funds comprise instructions to reduce an amount of the source funds by a service charge.

24. The money-transfer system recited in claim 15 wherein the first electronic token comprises a blinded electronic token.

25. The money-transfer system recited in claim 24 wherein the source funds are in the form of one or more blinded electronic tokens and the sender is anonymous.

26. The money-transfer system recited in claim 15 wherein:
the sender comprises a plurality of senders;
the instructions to receive source funds from the sender comprise instructions to receive a plurality of source-fund contributions from the plurality of senders; and
the instructions to determine the amount of the recipient funds comprise instructions to determine the amount of the recipient funds from a cumulative value of the plurality of source-fund contributions.

27. The money-transfer system recited in claim 26 wherein at least one of the source-fund contributions is in the form of one or more electronic tokens.

28. The money-transfer system recited in claim 26 wherein at least two of the source-fund contributions are in different currencies.

* * * * *